E. M. HAUNTY.
PLUMB RULE AND LEVEL.
APPLICATION FILED JUNE 9, 1908.
899,730.
Patented Sept. 29, 1908.
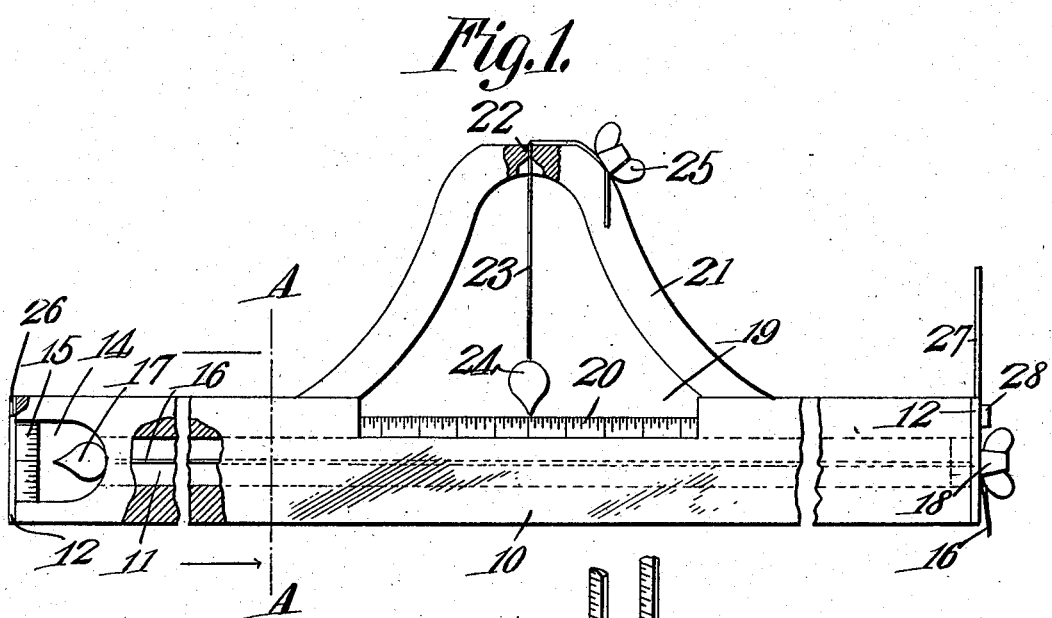
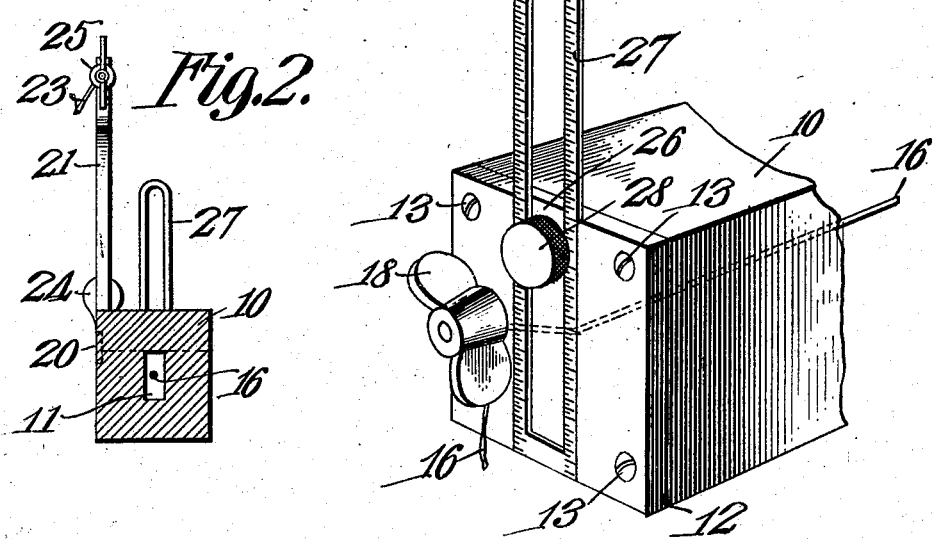
Witnesses
Inventor
Edward M. Haunty,
By C. A. Snow & Co.
Attorneys

UNITED STATES PATENT OFFICE.

EDWARD M. HAUNTY, OF MILTON, PENNSYLVANIA.

PLUMB RULE AND LEVEL.

No. 899,730.  Specification of Letters Patent.  Patented Sept. 29, 1908.

Application filed June 9, 1908. Serial No. 437,573.

*To all whom it may concern:*

Be it known that I, EDWARD M. HAUNTY, a citizen of the United States, residing at Milton, in the county of Northumberland and State of Pennsylvania, have invented a new and useful Plumb Rule and Level, of which the following is a specification.

This invention relates to plumb rules and levels of the type commonly used by carpenters, builders, contractors and others.

One object of the invention is to improve the general construction of such a device.

Another object of the invention is to provide a plumb rule and level with a means whereby grades, batters, and the like may readily be set off or measured.

A still further object of the invention is to provide a plumb rule and level which shall be free from the objectionable features incident to the employment of an air bubble as a means of leveling.

The invention consists in general of a level provided at or near its middle portion with a pair of projecting arms arranged to form a species of bow, a plumb bob carried on these arms for measurement of levels in a substantially horizontal direction, a plumb bob carried in the body of the level somewhat after the fashion of a brick mason's level, and suitable scales, one of which is adjustably carried on the level to indicate batters and slopes.

The invention further consists in certain novel details of arrangements and combinations of parts hereinafter fully described, illustrated in the accompanying drawings, and specifically set forth in the claims.

In the accompanying drawings, like characters of reference indicate like parts in the several views, and:—

Figure 1. is a side elevation of a level constructed in accordance with this invention, a portion being broken away to show the interior arrangement. Fig. 2. is a cross section of Fig. 1, on the line A—A. Fig. 3. is a perspective view of one end showing the adjustable scale.

The body, 10 of the level may be made of any desired material but is preferably made of thin sheet metal or as here shown of light wood. This body is provided with a central longitudinal recess 11, for purposes hereinafter to be described. Each end of the body is provided with a suitable plate 12, secured thereto by means of screws 13. At one end of the body portion is formed a recess or opening 14, wherein is mounted a scale 15, the central point of which is the zero or perpendicular point for the level when used in determining batters and setting posts and the like. Extending through the recess 11 is a cord 16 whereon is carried a plumb bob 17. The cord 16 is so arranged that it is centrally held at that end of the body opposite the scale 15 and there is provided at the suspension end a thumb nut 18 to secure the cord in position, the cord passing through an angled or otherwise offset passage so that the thumb nut is located to one side of the end plate 12. The passage 11 is made of less diameter than the plumb bob 17 and when it is desired to render the plumb bob inoperative the thumb nut 18 is loosened and the cord is pulled towards the suspension end of the body and the thumb nut again locked thereon. This brings the plumb bob against the mouth of the recess 11 and holds it there inactive. Furthermore, the thumb nut 18 allows for the adjustment of length of the cord so that the point of the plumb bob is nearly but not quite in contact with the scale 15.

The body portion 10 of the device is cut away to form a rabbet as shown at 19 and there is mounted in the rabbet a scale 20. On either side of the rabbet there is held one arm of a bow 21 extending outward to a considerable distance from the body. This bow is provided with a centrally located aperture 22 through which passes a cord 23 carrying a plumb bob 24. The plumb bob 24 is so located with reference to the scale 20 that the point thereof is held, when the device is level, over the zero point of that scale. Upon the bow 21 is mounted a thumb nut 25 arranged to clasp the end of the cord 23 so as to secure the same in any desired position. When the device is used vertically it is preferred that the plumb bob 24 be pulled well up to the top of the bow so that it will not hang loose and in the way. This is accomplished by loosening the thumb nut 25 and pulling upon the string 23. The string 23 is again placed under the thumb nut 25 and there clamped in the desired position. This thumb nut also may be used for adjusting the point of the plumb bob 24 into close relation with the scale 15. It is to be noticed that the divisions on the scales 15 and 20 are of such character that they will indicate respectively the number of the inches batter to the foot when the device is used vertically and the number of inches close to the foot when the device is used horizontally.

Each of the plates 12, is provided with a recess 26 wherein lies a scale 27 and clamp nut 28, preferably with a head which serves to hold the scale 27 in any desired position in the recesses. The scale 27 is used for two purposes. It is first used for adjustment of the level or plumb rule so as to place the plumb bob exactly over the zero point. When it is desired to lay off slopes or batters the scale itself may be adjusted below the desired end of the body portion so that when the plumb bob comes to zero the slope or batter will be indicated on the scale 27, that scale being divided suitably for the purpose. It is to be further noticed that the scale 27, may be positioned on either end of the body as desired the plates 12, each being recessed at 26 for the purpose.

By means of this device it will be found easy to obtain the grade required, lay off walls or posts with suitable batters or lay down roof timbers, wall plates and the like to a suitable slope.

There has thus been provided a simple and efficient device of the character described which will not readily get out of order and is not subject to variations in temperature.

It is obvious that minor changes may be made in the form, proportion and the construction of the device without departing from the principles thereof. It is not therefore desired to confine the invention to the exact form herein shown and described but it is wished to include all such as properly come within the scope thereof.

Having thus described the invention, what is claimed as new, is:—

1. A plumb rule and level comprising a body provided with a longitudinal opening therethrough, a scale at one end of the body, a plumb bob supported in the body, a bow carried on the body, a second plumb bob carried on said bow, a second scale held on said body below said second plumb bob, a thumb nut to hold said plumb bob in adjustment, and means on the body to vary the angular relation thereof with the surface to which it is applied.

2. A plumb rule and level comprising a body provided with a longitudinal opening therethrough, a scale at one end of the body, a plumb bob supported in the body, a bow carried on the body, a second plumb bob carried on said bow, a second scale held on said body below said second plumb bob, a thumb nut to hold said plumb bob in adjustment, and means on the body to vary the angular relation thereof with the surface to which it is applied, comprising a scale arranged to be slidably held at either end of the body, and lock nut for said scale.

In testimony that I claim the foregoing as my own, I have hereto affixed my signature in the presence of two witnesses.

EDWARD M. HAUNTY.

Witnesses:
 RICHARD BARRATT,
 MYRON W. REED.